United States Patent [19]
Zhang

[11] Patent Number: 6,108,345
[45] Date of Patent: *Aug. 22, 2000

[54] CONFIGURABLE WAN/LAN BRIDGE

[75] Inventor: Liping Zhang, San Jose, Calif.

[73] Assignee: 3Com Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/865,739

[22] Filed: May 30, 1997

[51] Int. Cl.$^7$ .................................................. H04L 12/413
[52] U.S. Cl. ........................................... 370/445; 370/401
[58] Field of Search .................................... 370/445, 401, 370/402, 389, 408, 420, 451, 449, 447, 466, 444, 469, 455, 459, 461, 462, 250, 254, 282, 285, 299, 303, 326, 327, 341, 345, 347, 359, 360, 362, 395, 396, 398, 400, 404, 419, 422, 437, 438, 442; 340/825.08

[56] References Cited

U.S. PATENT DOCUMENTS

| | | | |
|---|---|---|---|
| 4,751,701 | 6/1988 | Roos et al. | 370/281 |
| 5,289,467 | 2/1994 | Kartalopoulos | 370/406 |
| 5,408,469 | 4/1995 | Opher et al. | 370/401 |
| 5,426,637 | 6/1995 | Derby et al. | 370/401 |
| 5,490,252 | 2/1996 | Macera et al. | 370/402 |
| 5,530,842 | 6/1996 | Abraham et al. | 395/500 |
| 5,548,578 | 8/1996 | Matsune et al. | 370/401 |
| 5,568,476 | 10/1996 | Sherer et al. | 370/447 |
| 5,574,722 | 11/1996 | Slykhouse et al. | 370/452 |
| 5,610,903 | 3/1997 | Crayford | 370/213 |
| 5,633,865 | 5/1997 | Short | 370/412 |
| 5,649,100 | 7/1997 | Ertel et al. | 370/452 |
| 5,657,314 | 8/1997 | McClure et al. | 370/401 |
| 5,684,796 | 11/1997 | Abidi et al. | 370/252 |
| 5,719,862 | 2/1998 | Lee et al. | 370/355 |
| 5,732,071 | 3/1998 | Saito et al. | 370/401 |
| 5,740,175 | 4/1998 | Wakeman et al. | 370/422 |
| 5,754,552 | 5/1998 | Allmond et al. | 370/389 |
| 5,764,895 | 6/1998 | Chung | 370/402 |
| 5,802,054 | 9/1998 | Bellenger | 370/401 |
| 5,802,287 | 9/1998 | Rostoker et al. | 370/395 |
| 5,812,775 | 9/1998 | Van Seters et al. | 709/213 |
| 5,812,792 | 9/1998 | Haddock et al. | 709/200 |
| 5,815,500 | 9/1998 | Murono | 370/410 |
| 5,887,187 | 3/1999 | Rostoker et al. | 709/250 |
| 5,930,257 | 7/1999 | Smith et al. | 370/401 |
| 5,943,341 | 8/1999 | Gazda, Jr. | 370/403 |

*Primary Examiner*—Dang Ton
*Assistant Examiner*—Phirin Sam
*Attorney, Agent, or Firm*—Wilson Sonsini Goodrich & Rosati

[57] ABSTRACT

A device for connecting networks includes at least two communication channels, a first and a second medium access controller, a bus, and a configurable switch. Each of the communication channels is configured to support a transfer of data packets. The first and second medium access controller is configured to transmit and receive data packets. A data packet received by one of the medium access controllers is transmitted by the other of the medium access controllers. The configurable switch connects the first and second medium access controllers to one of the communication channels and the second medium access controller to the other of the communication channels. The connections between the medium access controllers and the communicatoin channels can be reconfigured statically or dynamically by the configurable switch. The communication channels may operate on different physical protocols. A conversion unit is provided to convert a packet received by one medium access controller in a first protocol to a second physical protocol. A packet processor is provided to extract a destination header from a data packet, append a destination header, and pass the destination header and data packet to the second medium access controller.

The present invention can also be characterized as a method for statically and dynamically altering the connections of a medium access controller to one of at least two communication channels.

15 Claims, 14 Drawing Sheets

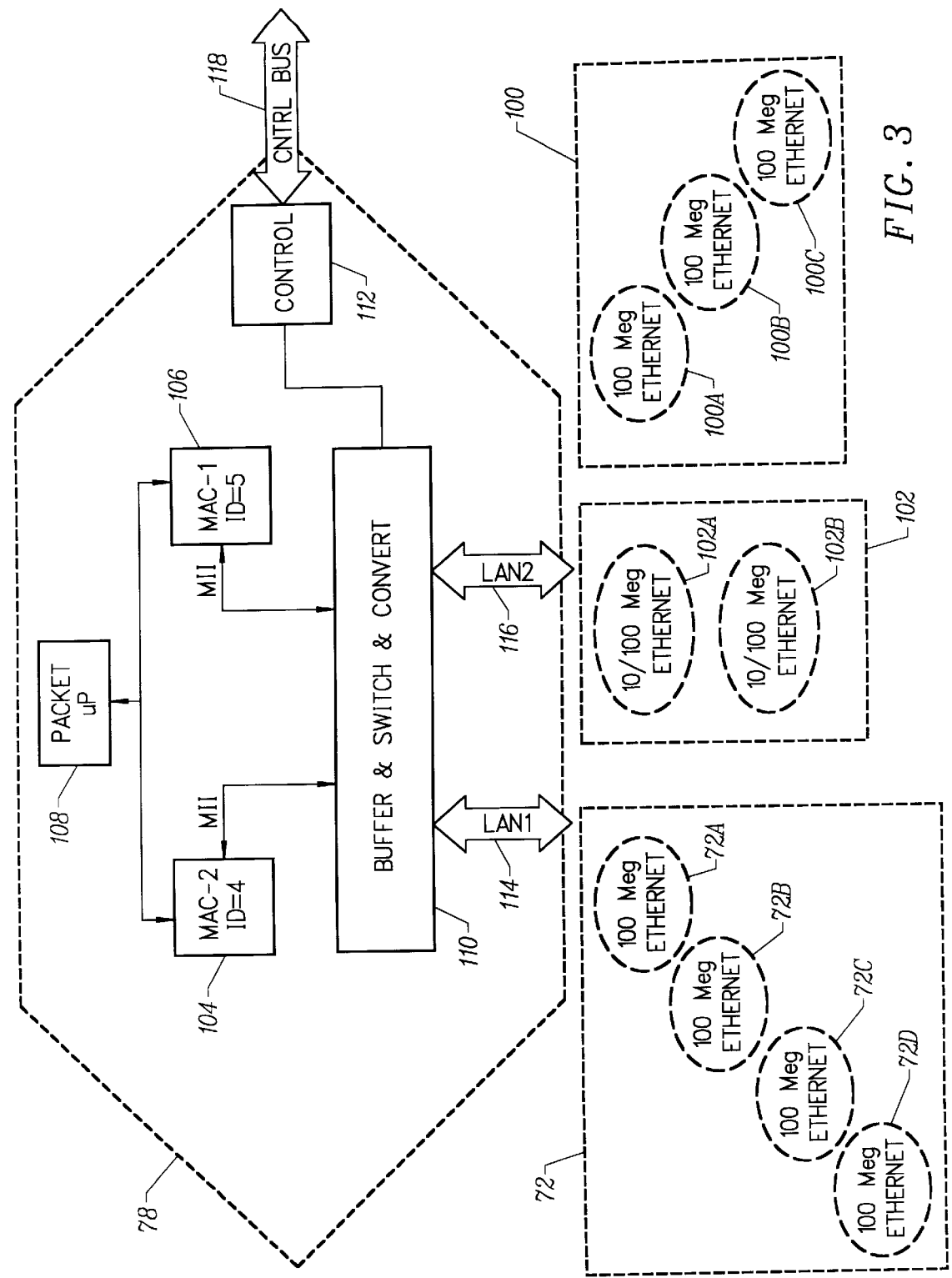

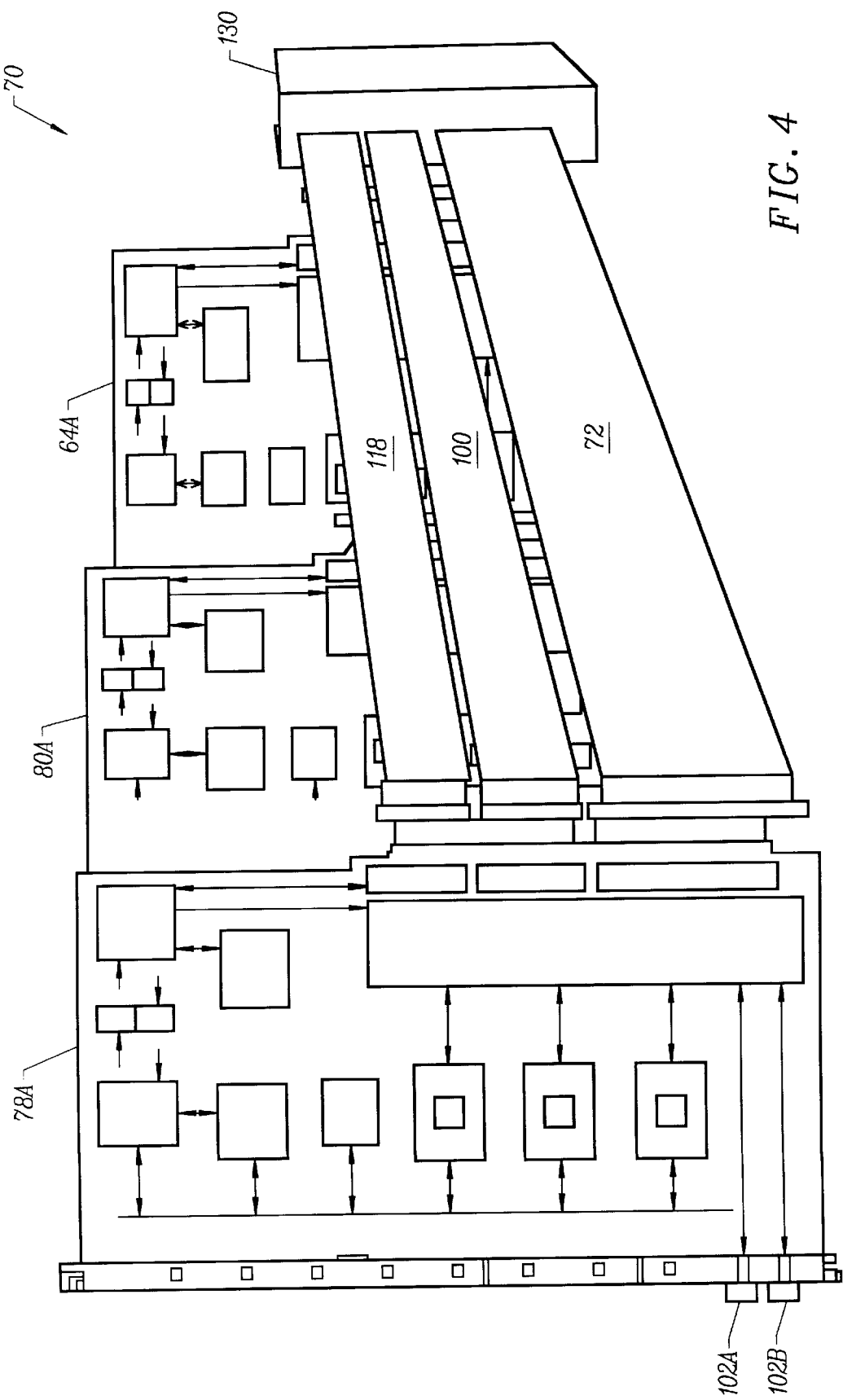

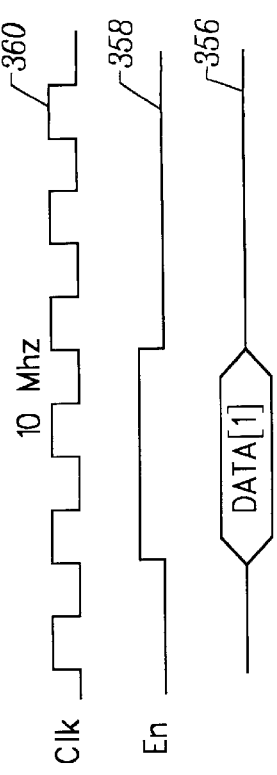
FIG. 8A
Ethernet (Fast) Backplane
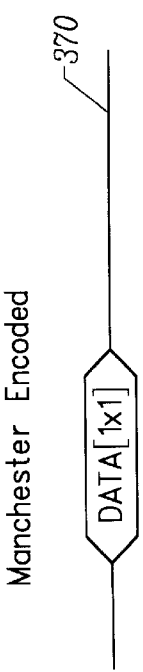
FIG. 8B
Ethernet (Slow) Backplane
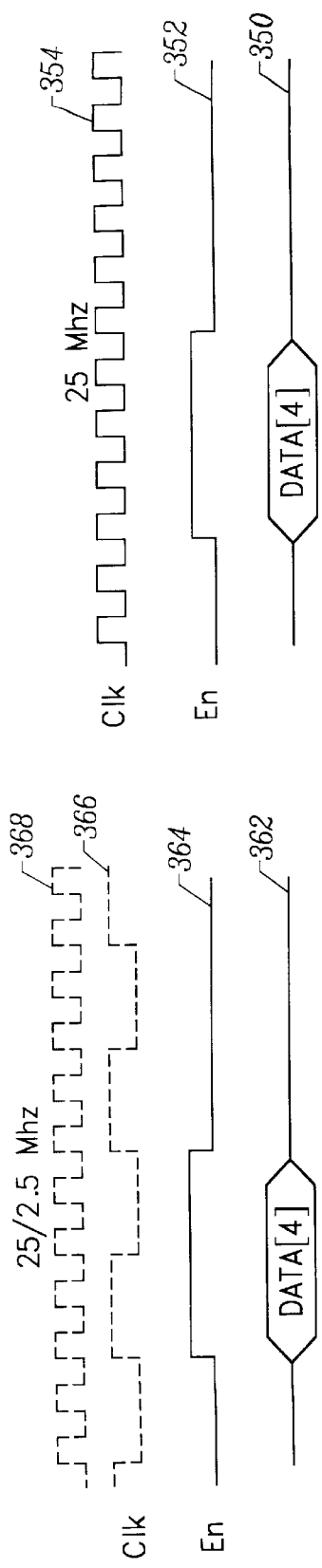
FIG. 8C
MII (100/10)
FIG. 8D
Ethernet (100/10) Front Port

CONFIGURABLE WAN/LAN BRIDGE

BACKGROUND OF THE INVENTION

1. Field of the Invention

The present invention relates to network intermediate devices for interconnecting shared and point-to-point networks, and specifically to a configurable WAN/LAN bridge.

2. Description of Related Art

Communications networks consist of terminals that are interconnected by links to network intermediate devices such as repeaters, switches, bridges and the like. The intermediate devices are used to interconnect the terminals to establish paths of communication among the terminals.

As network technologies have developed, a wide variety of techniques have evolved for operating links between terminals and intermediate devices. For example, the Ethernet network standard according to the IEEE Standard 802.3, published by the Institute of Electrical and Electronic Engineers, supports a variety of local area network (LAN) technologies. These technologies include the 10 BASE-T standard which specifies a 10 megabit per second carrier sense multiple access with collision detection (CSMA/CD) LAN over two pairs of twisted pair telephone wire, the 10 BASE-F standard which specifies a 10 megabit per second CSMA/CD LAN over fiber optic cable; the 100 BASE-TX standard specifies a 100 megabit per second CSMA/CD LAN over two pairs of category five UTP or shielded twisted pair wire, and a number of other current and emerging technologies. Typically data terminals in a network are designed to support a specific LAN technology. However, network intermediate devices which are designed to interconnect a wide variety of terminals, need a technique for resolving the particular technology used across a link coupled to a particular port of the device.

A CSMA/CD protocol has been widely adopted in a 10 megabit per second Mbs local area network standard known as Ethernet (ANSI/IEEE Standard 802.3). The 10 Mbps standard has been extended to 100 Mbs embodiments, as set forth in IEEE Standard 802.3u. Furthermore, the investigations are underway to extend the data rate of the CSMA/CD protocol even higher, for example up to 1 gigabit per second.

According to the CSMA/CD protocol, an end station has a medium access control (MAC) unit which, in order to transmit a packet first senses the status of the transmission medium to which it is attached to determine whether a carrier is present or not. If no carrier is present, then the MAC unit begins transmission of the packet. Because of the delay from transmission of a packet until a packet is received by a remote end station in the network, the possibility of collisions occurs. According to the CSMA/CD protocol, the MAC unit at each end station is capable of detecting such collisions. Thus, after beginning to transmit a packet, the MAC unit will continue to monitor the transmission medium to detect collisions. In order to ensure that all collisions are detected, the MAC unit must monitor for collisions during the transmission of the entire packet. Furthermore, if the packet is relatively short, there is a possibility that collisions may occur even after the MAC unit is finished sending the short packet. Thus, the MAC unit must continue to monitor for collisions for a finite amount of time after it begins transmission, often referred to as a slot time.

Thus, it can be seen that the consequences of collisions in the CSMA/CD based network can result in a significant amount of data being transmitted in the network at the expense of efficient use of the network. Prior art systems have developed to improve the efficiency of CSMA/CD networks. However, the prior art approaches come at the expense of more complicated network intermediate devices.

There is considerable software and hardware overhead associated with connecting networks. Physical and packet protocols must be matched. When the networks being connected are LAN and WAN, the former with a shared communication medium and the latter with a point-to-point communication medium additional overhead is present. The packets on the WAN link require additional processing to extract source and header information in order to place them on a LAN. This type of intra-network connection is particularly prevalent today as many corporations connect their LANs to the internet. To meet the challenge of this environment better cross network devices must be developed. Existing bridge and router technology presents a severe bottleneck to corporate communications with the outside world.

Improvements are needed in the way in which network connection devices handle the delays inherent in the network scheme required for management and resolution of collisions. Furthermore, it is desirable for such system to operate without increasing the minimum frame size applied to the network, and without propagating inflated collision fragments over the high speed to lower speed interfaces in the network. In addition, it is desirable to provide such improved system without requiring complex changes to existing MAC units.

SUMMARY OF THE INVENTION

According to the present invention a device for connecting networks is provided. The device includes at least two communication channels, a first and a second medium access controller, a bus, and a configurable switch. Each of the communication channels is configured to support a transfer of data packets. The first and second medium access controller is configured to transmit and receive data packets. The bus connects the first and said second medium access controllers. A data packet received by one of the medium access controllers is transmitted by the other of the medium access controllers. The configurable switch connects the first medium access controller to one of the communication channels and the second medium access controller to the other of the communication channels. A data packet on one of the communication channels with a destination identifier corresponding to said first medium access controller is received by the first medium access controller and transmitted by the second medium access controller to the other communication channels.

According to another aspect of the invention, each of the communication channels operates on a different physical protocol, including for example, Manchester encoded, and fast and slow Ethernet. A conversion unit is provided to convert a packet received by one medium access controller in a first protocol to a second physical protocol.

According to another aspect of the invention a packet processor is connected to the bus. The packet processor is adapted to intercept the data packet received by the first medium access controller, extract a destination header from the data packet, append a destination header to the data packet, and pass the destination header and data packet to the second medium access controller.

According to another aspect of the invention a third medium access controller is provided to receive data packets containing switch configuration commands. The controller is coupled to the configurable switch and to the third medium access controller. The controller passes the switch configuration commands to the configurable switch. The configurable switch is provided with a logic unit. The logic unit reconfigure the switch in response to the switch configuration commands from the controller.

The present invention can also be characterized as a method for connecting a medium access controller to one of at least two communication channels. The medium access controller is equipped to transmit data packets with a source identifier which corresponds to the medium access controller. The medium access controller is also equipped to receive data packets which include a destination identifier corresponding to the medium access controller. The method includes the steps of:

detecting a switch request to connect the medium access controller to a selected one of the two communication channels; and connecting the medium access controller to the selected one of the two communication channels.

In summary, the present invention allows reconfigurable connections between networks with different physical and packet protocols while reducing the complexity of the apparatus and methods required to produce that result.

Other aspects and advantages of the present invention can be seen upon review of the figures, the detailed description and the claims which follow.

BRIEF DESCRIPTION OF THE FIGURES

FIG. 3 is a functional block diagram of a configurable LAN/WAN bridge and a plurality of physical ports to which the bridge can be connected.

FIG. 4 is an isometric hardware block diagram of a chassis including a backplane and plug in LAN/WAN bridge cards, a WAN card, and a configuration management module.

FIGS. 8A–D are graphs of signals representative of the various physical protocols in the configurable LAN/WAN bridge cards, backplane and front ports of the chassis shown in FIG. 4.

PREFERRED EMBODIMENTS

The present invention provides a method and apparatus to bring traffic out of a high density remote access server linked to a wide area network(s) (WAN) such as the internet and to provide the traffic to a number of local area networks (LANs). In order to increase the bandwidth available for LAN/WAN traffic, a backplane is provided with a multiplicity of channels, across which WAN traffic is distributed. To move the WAN traffic out of the backplane to LANs, a plurality of configurable LAN/WAN bridge cards is provided which plug into the backplane channels. Each card contains conversion hardware to convert backplane WAN traffic from a point-to-point package protocol to a packet protocol suitable for the LAN(s) which are connected to the front ports. Each card contains several front port LAN connectors which can be configured to connect to any of the backplane channels. The physical ports and channels which are connected by each card, can be re-configured by a distributed managment module (DMM) which communicates across the backplane with a control module in each card.

Figure 1A:
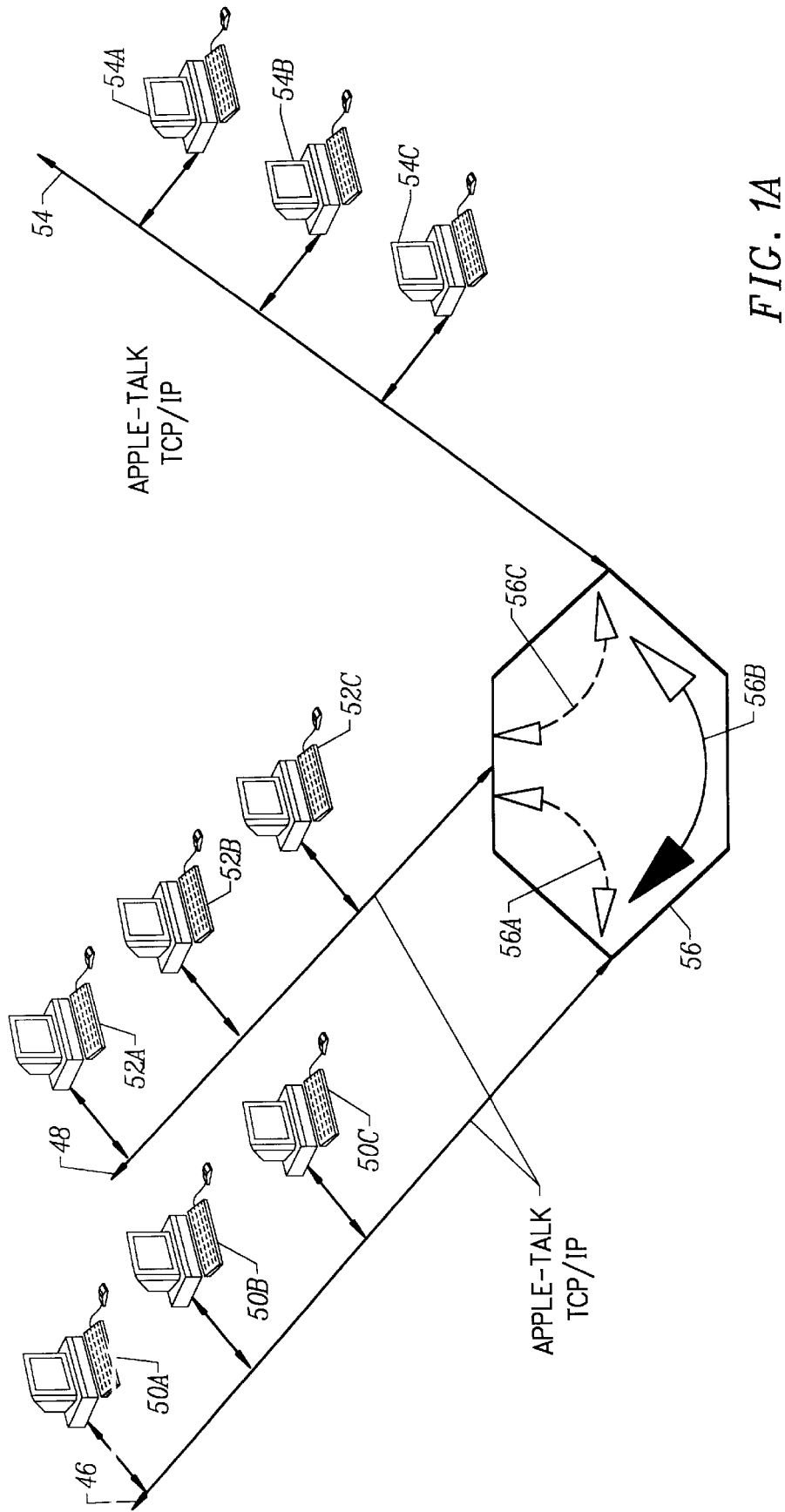
FIG. 1A is a hardware block diagram of a prior art arrangement of three local area networks communicating over a bridge.

FIG. 1A is a hardware block diagram of a prior art configuration of three networks joined by a bridge. Local area networks (LANs) 46, 48, and 54 are joined by bridge 56. LAN 46 includes hosts 50A–C. LAN 48 includes hosts 52A–C. LAN 54 includes hosts 54A–C. Bridge 56 accomplishes several functions. First, it copies transmissions, i.e., packets from a source on one LAN to a destination on a second LAN. Any traffic received by the bridge which is not destined for another LAN is rejected by the bridge. Second, the bridge extends the physical limits of a single LAN. For example, a LAN operating under an IEEE 802.3 (slow Ethernet) or IEEE 802.3u (fast Ethernet) specification has a maximum limit of not more than 2.5 kilometers. By installing bridges between segments the total distance covered can be increased. Third, unlike a repeater which just copies whatever it sees, a bridge can be programmed to exercise some discretion about what it forwards and what it does not forward and thus, enhances the security of this system. Fourth, a bridge can contain buffers enabling it to transmit packets from a fast LAN to a slower one. Fifth, a transparent bridge operates in promiscuous mode, i.e., accepting every frame transmitted on all the LANS to which it is attached. When a frame arrives, a bridge must decide whether to discard or forward it. If the frame is to be forwarded the bridge must decide on which LAN to put the packet. This decision is made by looking up the destination address in a big table inside the bridge. The table can list each possible destination and tell which output line, i.e., LAN it belongs on.

Within bridge 56, three different communication paths are represented by arrows 56A, 56B, and 56C connecting respectively LANs 46–48, 46–54, and 48–54. Within bridge 56, incoming packets for all the networks are processed as part of a single collision domain. Because the bridge provides only a single collision domain for LAN traffic only, only one transmission from one LAN is possible at any instant. In the example shown in FIG. 1A only the transmission from LAN 54 to LAN 46 is taking place as indicated by arrows 56B. Thus, while all LANs may at any point in time be generating packets destined for transmission to another of the LANs, only one of these packets can be handled at any time. A bridge such as that shown in FIG. 1A, is therefore appropriate for environments in which communication between LANs segments is minimal.

Figure 1B:
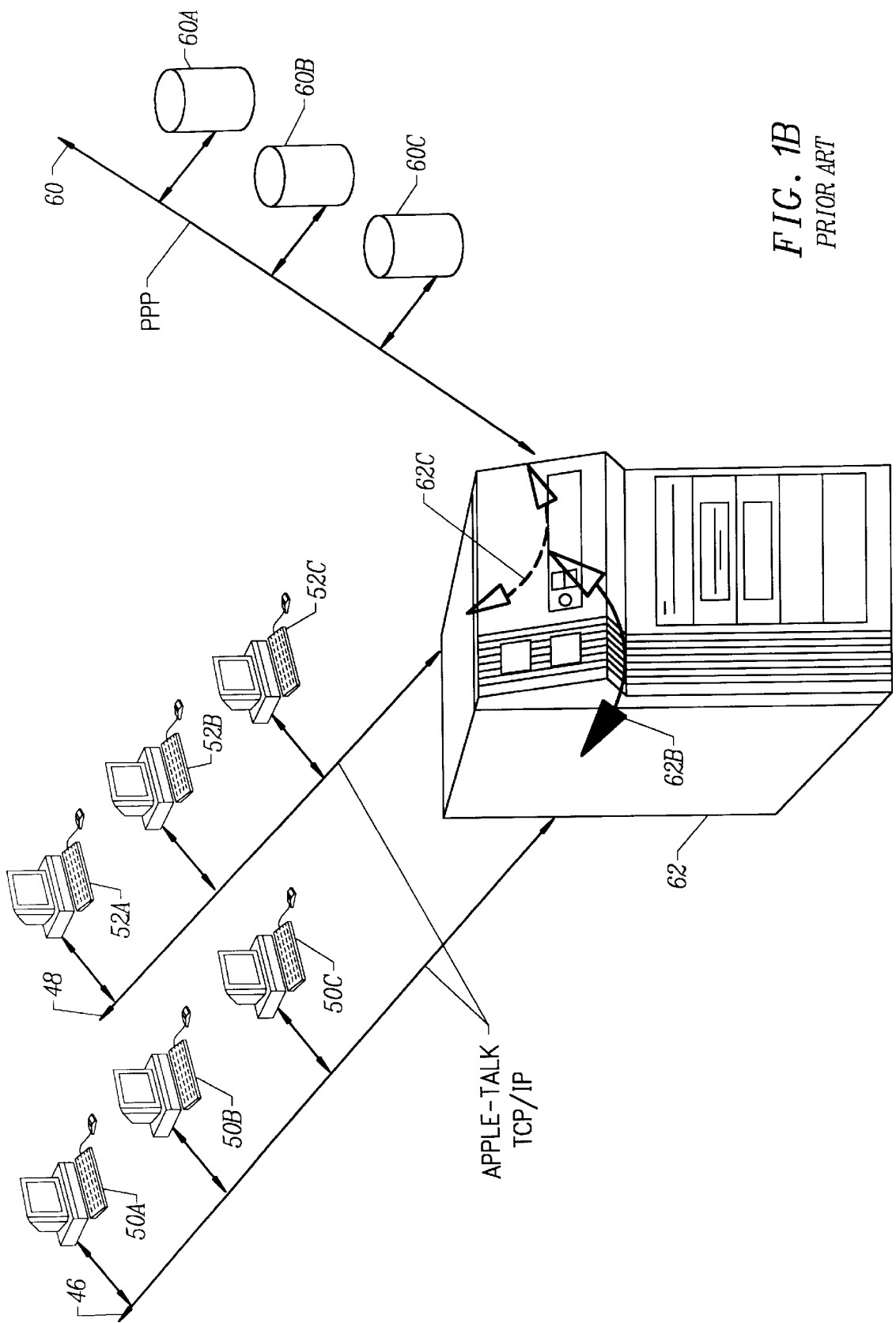
FIG. 1B is a hardware block diagram of a prior art arrangement of two local area networks communicating over a host server with a wide area network.

FIG. 1B shows a prior art apparatus for providing LAN access to a wide area network (WAN) such as the internet. LANs 46–48 are connected by a server 62 to a wide area network 60. WAN 60 is shown comprising servers 60A–C. These might for example correspond to high volume sites on the Internet. Server 62 forms a link between the WAN 60 and LANs 46 and 48. LAN 46 comprises hosts 50A–C. LAN 48 comprises hosts 52A–C. As shown by the arrows 62B–C which represent communication paths between the networks, only one collision domain exists. In the example shown, only one transmission 62B, from WAN 60 to LAN 46 is taking place. Thus, while all LANs may at any point in time be generating packets destined for transmission to the WAN, only one of these packets can be handled at any time.

In addition to the bottleneck, created by having only one collision domain in the host 62, there is another limit to high volume cross-network traffic. WAN and LAN traffic differ significantly in both the speed at which data is transmitted, i.e. the physical protocol, as well as the format of the data itself, i.e., the packet protocol. The difference in physical protocol is significant, i.e., payloads received from the WAN may be passed at only 1.55 Mbps, even with a Ti connection while payloads on the LANs can be passed at 10/100 Mbps. The difference in packet protocols is also different. LAN traffic is connectionless, and thus LAN packets must contain source and destination addresses. WAN traffic is point-to-point and therefore contains no source and destination address. The host must handle these physical and packet protocol conversions as well as the routing function, and thus a considerable software overhead is added to the handling of traffic. Existing bridge/router technology presents a severe bottleneck to corporate communications with the outside world.

A detailed description of preferred embodiments of the present invention is provided with respect to FIGS. 2–9. FIG. 2A is functional block diagram showing a chassis containing configurable LAN/WAN bridges for linking several local area networks to a WAN. A high density remote access chassis 70 is coupled to LANs 46, 48 and wide area network 60. Local area networks 46–48, are running a slow Ethernet protocol. Local area network 46 includes hosts 50A–C. Local area network 48 includes hosts 52A–C. Wide area network 60 includes servers 60A–C. High density remote access chassis 70 includes configurable LAN/WAN bridges 74–80, WAN bridge 60, switch 84, configuration table 82, and backplane channels 72A–C. LAN 46 is connected to configurable LAN/WAN bridge 78 which is in turn connected to a backplane channel 72B. Channel 72B is in the preferred embodiment running a fast Ethernet physical protocol of 100 Mbps. LAN 48 is also connected to channel 72B via another configurable LAN/WAN bridge 80. WAN 60 is connected to channel 72B via WAN bridge 64. Thus, in contrast to the hardware block diagrams shown in FIG. 1B a plurality of configurable LAN/WAN bridges are used to connect WAN and LAN. High speed traffic from WAN 60 to both of local buses 46 and 48 can be accommodated provided only that configurable bridges 78 and 80 have sufficient buffering. The connections between each configurable bridge 74–80 and LANs 46–48 and channels 72A–C is determined by switch 84 and configuration table 82. The combination of a plurality of backplane channels across which WAN traffic can be distributed coupled with the plurality of configurable LAN/WAN bridges assures that high density remote access chassis 70 can be configured to accommodate various hardware environments.

Figure 2A:
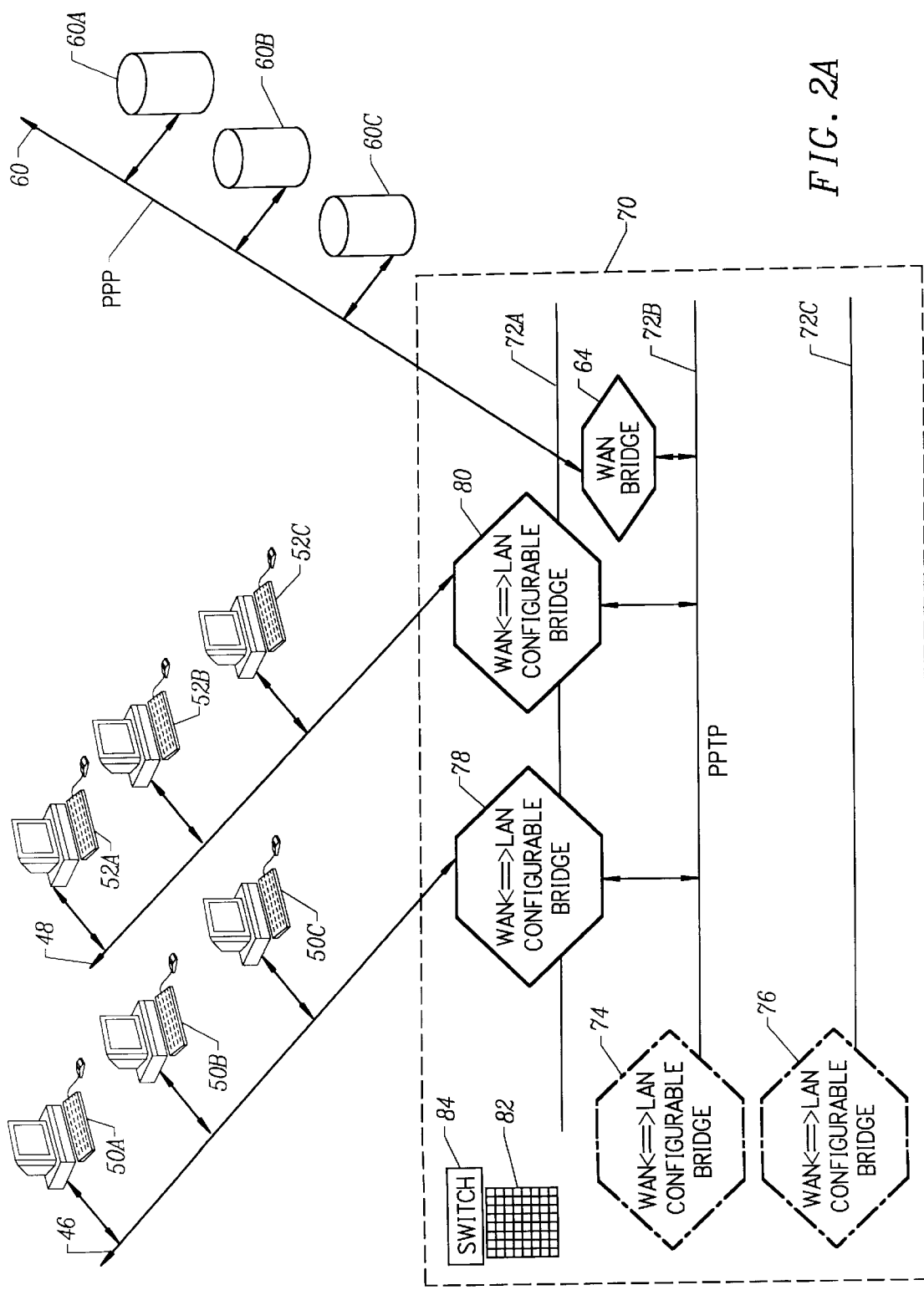
FIGS. 2A–C are functional block diagrams showing a chassis containing configurable LAN/WAN bridges for linking local area and wide area networks.
Figure 2B:
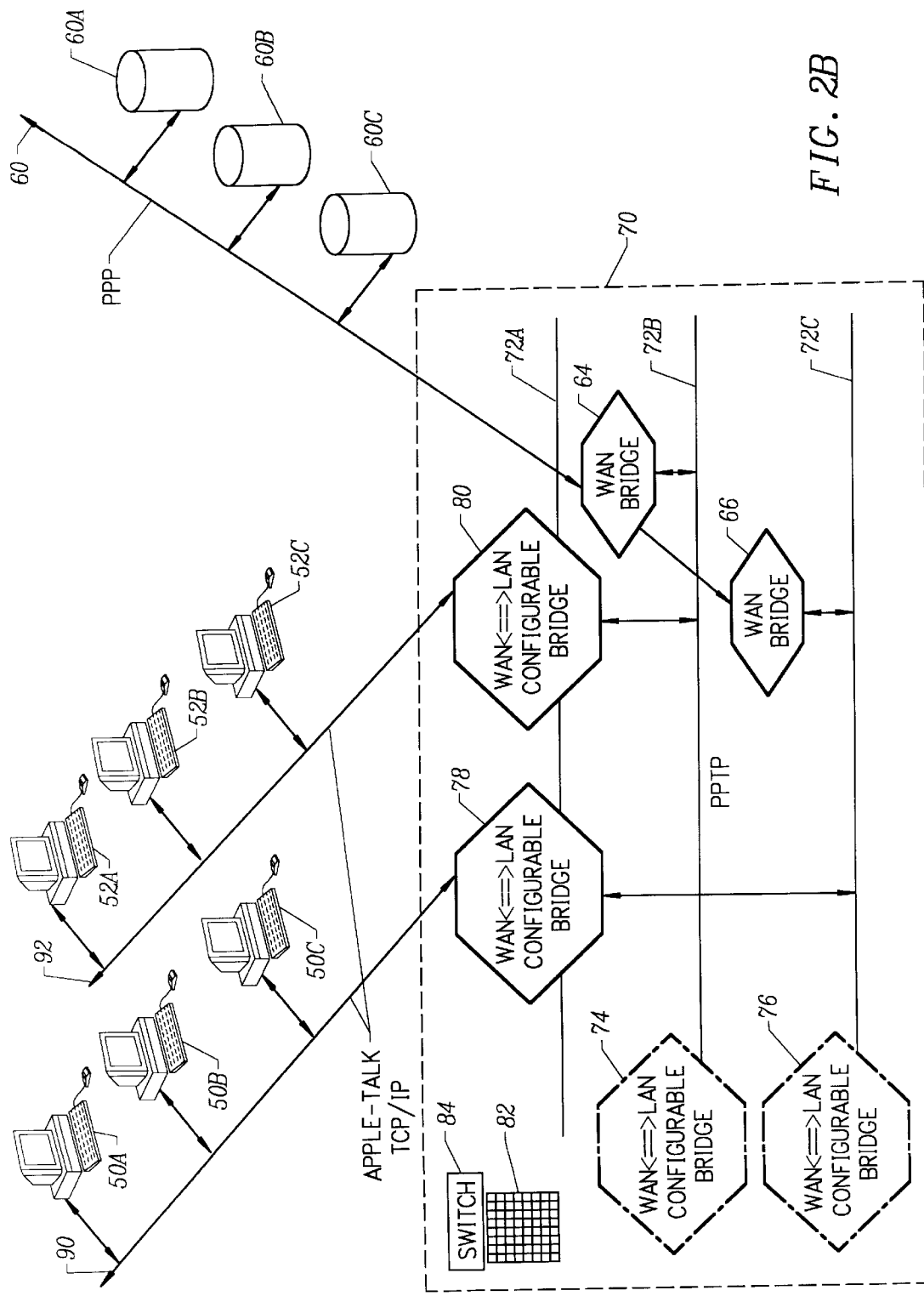

FIG. 2B is a functional block diagram similar to FIG. 2A with a different configuration of LAN/WAN bridges. High density remote access chassis 70 is coupled to WAN 64 and to LANs 90 and 92. LAN 90 and 92 are running a fast Ethernet protocol 802.3u at 100 Meg bit per second. These networks are thus capable of accommodating a higher volume of packets than are LANs 46–48 shown in connection with FIG. 2A. To accommodate this higher demand, remote access chassis 70 has been reconfigured by switch 84 and table 82. WAN 64 is connected to backplane channel 72B via WAN bridge 64, and to backplane channel 72C via WAN bridge 66. Configurable WAN/LAN bridge 80 connects LAN 92 to backplane channel 72B. Configurable WAN/LAN bridge 78 connects LAN 90 to backplane channel 72C. WAN traffic has been split between two separate backplane channels 72-B and C. Each channel has its own collission domain. Thus, two transmissions can take place concurrently, one on backplane channel 72B and the other on channel 72C. Thus, a higher volume of packet traffic can be provided between LANs 90 and 92 and WAN 60 than can be provided in the configuration discussed above in FIG. 2A.

Figure 2C:
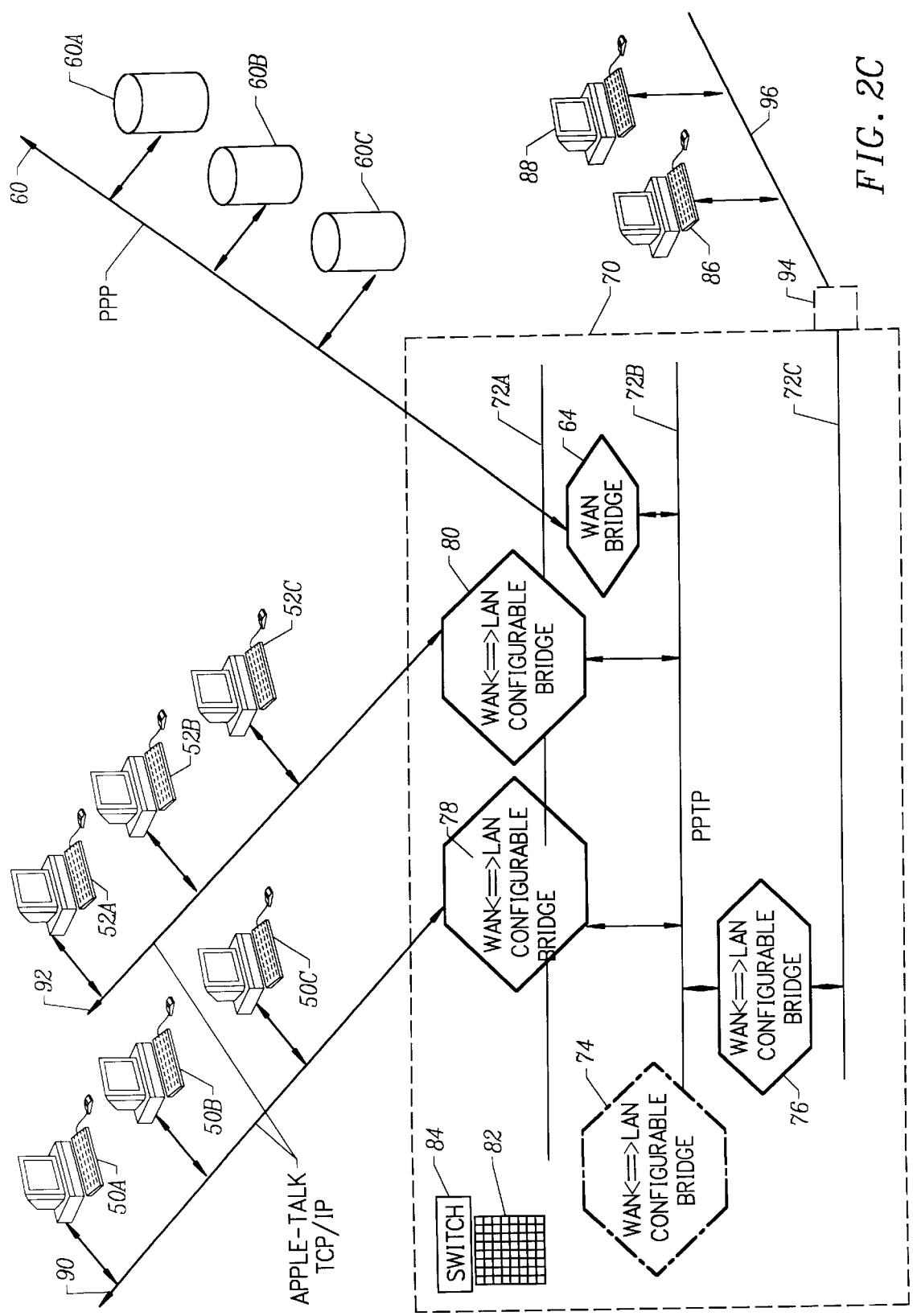

FIG. 2C is a functional block diagram similar to FIG. 2B with a different configuration of LAN/WAN bridges. High density remote access chassis 70 is coupled to WAN 64 and to LANs 90, 92, and 96. LANs 90, 92, and 96 are running a fast Ethernet protocol 802.3u at 100 Meg bit per second. LAN 96 is connected directly to backplane channel 72C via hub 94. LAN 96 includes hosts 86 and 88. Remote access chassis 70 has been reconfigured by switch 84 and configuration table 82. WAN 64 is connected to backplane channel 72B via WAN bridge 60. Configurable WAN/LAN bridge 80 connects LAN 92 to backplane channel 72B. Configurable WAN/LAN bridge 78 connects LAN 90 to backplane channel 72B. Configurable WAN/LAN bridge 76 connects channel 72B to channel 72C. Thus LAN 96 has access to WAN traffic on channel 72B via WAN/LANd bridge 76.

FIG. 3 is a high level hardware block diagram of one of the configurable bridges within the remote access chassis 70 shown in FIGS. 2A–B. Bridge 78 comprises; packet processor 108, medium access controllers (MACs) 104–106, control 112, and buffer switch conversion unit 110. The packet processor is linked to the two MACs over a common buss. Each of the MACs is linked to the buffer switch conversion unit on its own dedicated channel. The control 112 is linked to the buffer switch convertion unit. The buffer switch conversion unit 110 includes LAN links 114–116. LAN links 114 and 118 can be coupled to any one of a number of physical ports/channels, including: fast Ethernet bus 72, slow Ethernet bus 100 and the front port 102. The fast Ethernet bus includes channels 72A–D. The slow Ethernet bus 100 includes slow Ethernet channels 100A–C. The front port 102 includes front port connectors 102A–B. Control bus 118 connects the control unit of each bridge to a distributed management module in the chassis. The coupling of LANs 114–118 to a specific physical channel is governed by buffer switch and conversion unit 112, in a manner which will be described in detail in later drawings and specifically FIG. 5.

In operation, control 112 configures buffer switch conversion unit 110 to connect MAC 104–106 to a pair of physical ports/channels. Packets received across either of LANs 114 or 116, are passed to the buffer switch conversion unit. In the buffer switch conversion unit, the packet is sent to one of the MACs as determined by the switch configuration established by control 112. Before the buffer switch conversion unit sends the packet, the packet must first be converted from the physical protocol of the port/channel to a medium independent interface (MII) protocol so that it can be processed by the MAC. The buffer switch conversion unit performs this operation. As each packet is received by a MAC, the MAC examines a header on the packet to determine if the packet destination corresponds to the MAC identifier. Assuming there is a match, MAC strips off the header and passes the packet to the packet processor 108. The packet processor may perform any of several operations on the packet. At a minimum, it unfolds the payload portion and extracts a destination header indicating which host on the destination LAN the packet is destined for. This identifier is appended to the payload. Additionally, the packet processor may buffer or compress/decompress the packet depending on the protocol established. The packet is then passed back to the MAC linked to the physical port/channel for which the packet is destined. These outgoing packets have a source identifier appended to them. The source identifier corresponds to the MAC from which they are transmitted. The packet is passed to buffer switch conversion unit. Buffer switch conversion unit implements a physical protocol conversion from an MII protocol to a protocol appropriate for the physical port/channel to which the packet is being sent.

FIG. 4 shows an isometric view of a preferred embodiment of the hardware associated with a high density remote access server chassis 70. The chassis comprises three cards connected to a backplane. Cards 78A and 80A correspond to configurable bridges 78 and 80 shown in FIGS. 2A–B. Card 64A corresponds to WAN bridge 64 shown in FIGS. 2A–B. Cards 78A, 80A, and 64A plug into a backplane. The backplane includes three busses. Bus 72 is the fast Ethernet bus, bus 100 is the slow Ethernet bus, and bus 118 is the management bus. Each of the backplane busses 72, 100, and 118 is connected to a distributed management module (DMM). Each of cards 78A and 80A has two front ports. Ports 102-A and 102-B on card 78A are shown.

Figure 5:
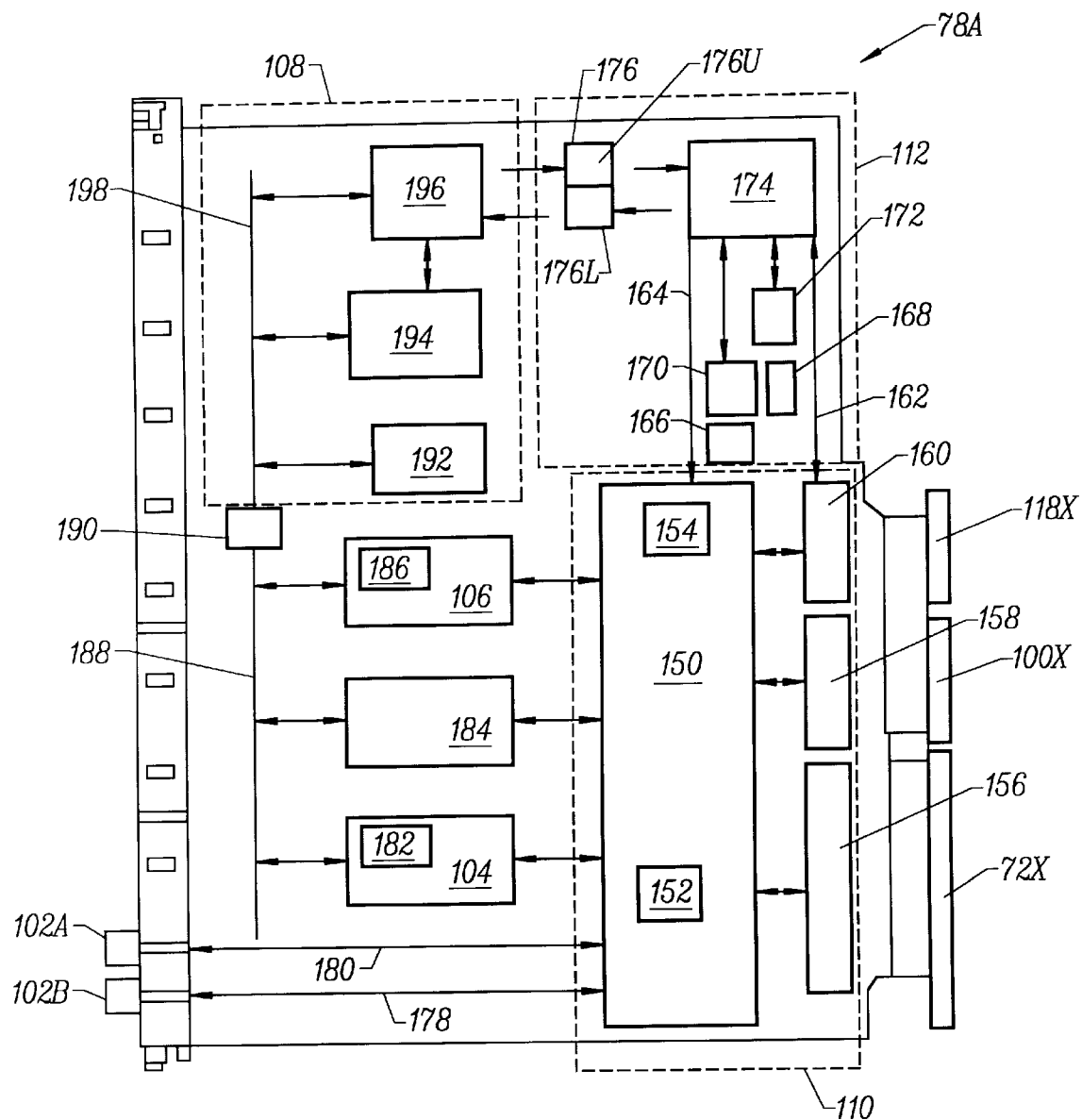
FIG. 5 is a hardware block diagram of a configurable LAN/WAN bridge card.

FIG. 5 is a detailed hardware block diagram of the components of a representative configurable bridge and packet processor card 78A. The card has access to 9 physical ports through connectors on the front and back of the card. Connector 72x connects the card to the four backplane fast ethernet channels in bus 72. Connector 100x connects the card to the three slow ethernet channels on the backplane bus 100. Front ports 102A–B provide a connection from the card to LAN segments which can be plugged into the front ports. The DMM unit, shown in FIG. 4 controls all the cards in the chassis 70, including card 78A. Each card is connected to the DMM via management bus 118. Card 78A is connected to management bus 118 via connector 118x. The card includes a buffer switch and conversion unit 110, a control unit 112, a packet processor unit 108 and media access controllers 104, 106 and 184.

Buffer switch and conversion unit 110 includes MAC/PHY switch 150, and drivers 156–160 for respectively the fast ethernet, slow ethernet, and management, backplane buses of chassis 70. The MAC/PHY switch includes control registers 152–154. The control unit 112 includes control microprocessor 174, mail box 176, control memory 172, power on reset 170, DIP Configuration Switch 168, and nonvolatile configuration PROM 166. The mail box includes an upper portion 176U and a lower portion 176L. The packet processor unit 108 includes microprocessor 196, packet processor memory 194, and compressor 192.

Configurable Bridge

Functionally, the card operates both as a configurable bridge and as a protocol converter. As a configurable bridge, the MAC/PHY switch 150 determines which of 8 physical devices either of MACs 104 and 106 will be connected to. For example, switch 150 can be configured to connect both MACs 104 and 106 to either of front ports 102A–B via front port signal lines 180–178 respectively. Alternately, switch 150 can be configured to connect one of MACs 104–106 to a front port and the other of MACs 104–106 to a backplane channel on either of busses 72 or 100. The backplane channel connection can be to any one of three slow ethernet channels on the bus 100 or the four fast ethernet channels on the bus 72. Finally, switch 150 can be configured to connect both MACs 104–106 to any two of the backplane channels on either the fast or slow ethernet buses 72 or 100. Switch 150 is responsive to commands received from control unit 112. There are two static and two dynamic ways in which switch 150 can be controlled. Statically, the switch can be configured on power-up by either DIP switch 168 or by a configuration stored in non-volatile configuration RAM 166. When the card is powered up the DIP switch or NV RAM setting is passed to control microprocessor 174. These settings are passed over switch control line 164 to switch 150 and result in an initial switch configuration. This switch configuration establishes specific connections between the 9 physical ports and the 2 MACs as discussed above.

Dynamic Configuration

Dynamically, the card can be reconfigured during runtime by commands sent over control bus 118, and received at management backplane bus connector 118X. The control bus 118 has both a serial and a LAN segment which allow the DMM to communicate with each of the cards 78A, 80A and 64A shown in FIG. 4. The DMM communicates along the serial portion of the management bus by sending out command packets each of which has a header identifying the specific card for which the command is destined. Commands destined for card 78A will be passed via management bus connector 118x and serial managment line 162, to control processor 174. Upon receipt of a command, control processor 174 passes a switch notification request to packet processor 196, via the lower portion 176L of mail box 176. The mail box operates as a bridge between the packet processor 196 and the control processor 174. In a preferred embodiment, the mail box is a dual port memory with an upper portion reserved for communications from the packet processor to the control processor, and a lower portion reserved for communications from the control processor to the packet processor. When a switch notification request is received by packet processor 196, the packet processor interfaces with MACs 104–106. In a first embodiment the packet processor will signal the MACs to abort any packets they may currently be processing. In an alternate embodiment, the packet processor may examine the status of the MACs 104–106 to determine when they are not processing packets. In this embodiment, the packet processor will examine the status of both MACs to detect a quiescent state corresponding to a lack of packet processing. The packet processor makes this determination on the basis of the contents of a status register in each of the MACs. MAC 104 has a status register 182 and MAC 106 has a status register 186. A specific bit in each of these status registers is enabled when a packet is being processed and disabled when no packet is currently being processed. When the packet processor has detected that no packets are currently being processed in the MAC(s) being switched, it notifies the control processor.

The packet processor notifies the control processor by placing an indicator of a quiescent state in the upper portion 176U of mail box 176. Control processor retrieves that information from the mail box portion 176U. The control processor 174 then writes, via switch control line 164, a switch command to registers in MAC/PHY switch 150. MAC/PHY switch 150 has two registers 152–154 associated with respectively MACs 104–106. In a preferred embodiment, there are specific bits in each of these registers corresponding to each of the physical ports to which either MAC can be connected. In this specific example there would be 8 bits in each of the registers. These bits each correspond to one of the 4 fast and 3 slow ethernet channels and a front port. Generally, all except one bit in each register is in a disabled condition. If, for example, the bit in register 154 corresponding to front port 102A is enabled, then MAC 106 will be connected via switch 150 to front port 102A. Further, if the bit in register 152 corresponding to one of the four fast ethernet segments of bus 72 is enabled, then MAC 104 will be connected via switch 150 to that specific segment of the fast ethernet bus.

An alternate means exists by which a card can be dynamically reconfigured. Backplane bus 118 also contains a management LAN which allows the DMM operating either on its own or in conjunction with an external management device such as a router to send reconfiguration commands to any one or all of the cards attached to the backplane over a management LAN (MLAN) portion of managment bus 118. The commands, when received by configurable WAN/LAN bridge card 78A, are passed through management bus connector 118x to management bus driver 160. From the management bus driver, they are passed through MAC/PHY switch 150 to control bus MAC 184. Control bus MAC 184 passes the command packet to packet processor 196. Specifically, the packet is passed from MAC 184 along MAC bus 188 to bus bridge 190 where it is placed on packet processor bus 198 and retrieved by packet processor 196. The packet processor passes the command to the control processor by placing the command in the upper portion 176U of mail box 176. The control processor 174 retrieves the command. When the control processor 174 receives the command it initiates a request process similar to that described and discussed above in detail in connection with the commands received over the serial portion of the management bus 118. Specifically, the control processor sends a request to the packet processor to interrupt or abort the packet processing process.

When the request packet is received by packet processor 196 the packet processor may either command MACs 104 and 106 to abort packet processing or may monitor the status registers 182 and 186 of those MACs to determine when there is a pause in packet processing. The packet processor may use either protocol. In either event, when the packet processor has completed its interface with MAC units 104 and 106 it notifies the control processor 174 by placing its response in the upper portion of mail box 176U from whence it is retrieved by control processor 174. Then, control processor 174 writes the appropriate switch command to either or both of the command registers 152 and 154 of switch 150. Switch 150 reacts to the updated status of the command registers 152 and 154 to reconfigure the connections between either or both of MACs 104 and 106 and any of the 8 physical ports described and discussed above.

Packet Processing/Conversion

The additional functions performed by the configurable bridge have to do with protocol conversion of the data that is being passed through the configurable bridge. There are 2 different levels of protocol conversion which are accomplished by card 78A. Card 78A accomplishes both physical protocol conversion and payload protocol conversion.

The term physical protocol conversion applies to that conversion necessary to allow data to be passed by card 78A between the physical ports which may be operating under different physical protocols. This functionality of the card will be discussed in greater detail in connection with the following FIGS. 7, 8A–D. However, switch and conversion unit 150 can take data in a media independent interface (MII) format from MACs 104 and 106 and transform it into any one of four different physical protocols corresponding to the physical port to which the data is being transferred. These ports may differ in physical protocol not only in terms of clock speed, but also in features as basic as the number of bit lines available to transmit and receive data packets. Switch and conversion unit 150 handles these physical protocol conversion tasks.

Payload protocol conversion functions are handled in a traditional manner well known to those skilled in the art by the packet processing unit 108. For example, packets received over internet connection 60 by WAN bridge 64 do not have the proper protocol to be introduced onto any of the backplane segments 72 or 100. They lack, for example, a source and destination header. They are the product of a point-to-point connection between WAN bridge 64 and a specific internet site. WAN bridge 64 appends a destination headers to the incoming point-to-point protocol (PPP) data frame received over the internet point-to-point link. These are placed on the backplane channel as a point-to-point tunneling protocol (PPTP) data package and have a header containing a MAC identifier corresponding to the specific MAC in the specific configurable bridge and packet processor card for which the packet is destined. For example, let's assume that card 78A is connected as suggested in FIG. 2A to both a backplane fast ethernet channel on bus 72 and to LAN 46. Let's assume further that the card has been configured by switch 150 to connect MAC 104 to LAN 46 via front port 102-A and MAC 106 to fast ethernet segment 72B. Under these conditions MAC 106 will reject all traffic on fast ethernet segment 72B except those packets which have an identifier corresponding to MAC 106. These packets will be converted from an IEEE 802.3u protocol, i.e., fast ethernet protocol, to an MII protocol by switch and conversion unit 150 and passed to MAC 106. MAC 106 will strip the header off the packet and pass it to packet processor 196. Packet processor will unfold the payload portion of the packet and attach a header corresponding identifier for the one of workstations 50A–C on LAN 46 to which the packet is destined. These workstations are shown in FIG. 2A. The payload processor 108 may additionally decompress the payload portion of the resultant packet before passing it with the workstation destination identifier to MAC 104. MAC 104 will in turn append a source identifier corresponding to its ID to the packet. The packet is then passed in an MII protocol to switch and conversion unit 150. Switch and conversion unit 150 will transform the packet from an MII physical protocol to a physical protocol appropriate for the front port 102A. In a preferred embodiment this protocol is Manchester encoding of data. This protocol which will be discussed in connection with FIG. 8A–D is different than the physical protocol on either of the backplane busses 72 and 100.

Figure 6:
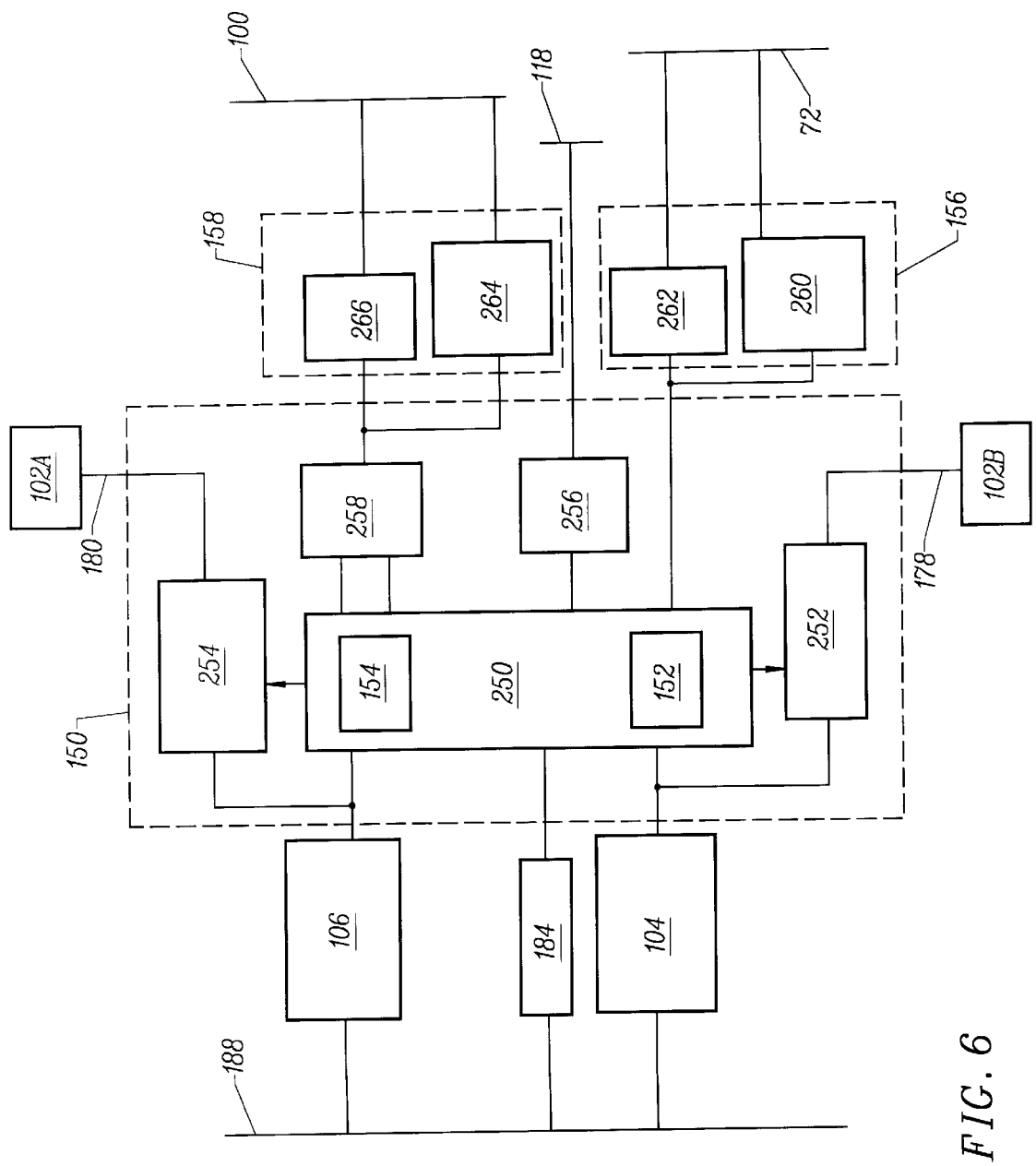
FIG. 6. is a detailed hardware block diagram of the medium access controllers, configurable switch, conversion, and backplane portions of the bridge card shown in FIG. 5.

The manner in which switch and conversion unit 150 accomplishes its switching and conversion functions can be better appreciated through a discussion of the details of that switch shown in FIG. 6. FIG. 6 is a detailed hardware block diagram including MACs 104, 106, 184; MAC/PHY switch 150, front ports 102A–B and fast and slow ethernet bus drivers, respectively 156 and 158. MAC/PHY switch 150 includes field programmable gate array (FPGA) 250, front port interfaces 252–254, control bus interface 256 and slow ethernet backplane switch 258. FPGA 250 includes control registers 152–154. Slow ethernet driver 158 includes BTL driver 266 and collision detector 264. Fast ethernet driver 156 includes BTL driver 262 and collision detector 260.

MACs 104–106 are connected to bus 188. MACs 104–106 can be connected to either the front ports 102 or the backplane busses 72 and 100. MAC 106 can communicate with front port 102A via front port interface 254 and signal line 180. MAC 104 can communicate with front port 102B via front port interface 252 and signal line 178. Interfaces 252–254 are enabled or disabled by FPGA 250. Both MACs 104–106 can also be connected to any channel of either the fast or slow ethernet busses 72 and 100 respectively, by operation of FPGA 250. FPGA 250 can form a connection from either or both MACs to any of the four channels of the fast ethernet bus 72 via collision detector 260 operating in conjunction with BTL driver 262. Furthermore, MACs 104 and 106 can be connected via FPGA 250 to any of the three channels of the slow ethernet bus 100 via switch 258 operating in conjunction with collision detector 264 and BTL 266. Switch 258 operating in conjunction with FPGA 250 determines which of the three channels of the slow Ethernet Bus 100 a MAC will be connected to.

When a connection is made to one or more channels of either the fast 72 or slow 100 Ethernet busses, those connections are monitored by respectively collision detection units 260 and 264. These units are analog units which monitor signal levels on the backplane channel. When an abnormal signal level is detected, a collision on a backplane channel is indicated. That collision inidication is passed back to whichever MAC is connected to the channel. If that MAC is in the process of transmission, then the transmission will be halted and the MAC will back-off, i.e. cease transmission, for an appropriate time before attempting to retransmit a packet. The collision detection unit 264 performs a similar collision detection function for the channels of the slow Ethernet bus 100. BTL drivers 262 and 266 provide a level shifting function. BTL driver converts the signal level from any of the channels of the fast ethernet bus to the levels appropriate for the FPGA. BTL driver 266 performs a similar function for the signals between the slow Ethernet bus 100 and the FPGA. All traffic from MACs 104, 106 and 184 to the FPGA follows a media indepedent interface (MII) physical protocol. FPGA 250 converts that MII physical signal protocol to the appropriate signal protocol for whichever backplane channel is communicating with a MAC. For communications between a MAC and a front port, the conversion function is handled by interface devices 252–254. MAC 184, the management MAC, communicates with the MLAN portion of management bus 118 via FPGA 250 operating in conduction with control bus interface 256.

In a preferred embodiment the interface units 252 and 254 comprise the VLSI chip with model # DP83840/83223 manufactured by National Semiconductor. FPGA 250 is programmable chip with model # ATT2C10 manufactured by Lucent. Switch 258 is VLSI chip model # 53/00317 manufactured by 3COM Corporation. BTL driver 266 comprises integrated circuit chip with model # DS3897 manufactured by National Semiconductor. BTL driver 262 comprises integrated circuit chip with model # DS3896 manufactured by National Semiconductor. Collision detection unit 264 comprises an integrated circuit chip with model # AM26LS32 manufactured by AMD. Collision detection unit 260 comprises an integrated circuit chip with model # NE521 manufactured by Phillips. Finally, front ports 102A and 102B comprise RJ45 connectors. The RJ45 connectors provide a connection for a LAN implementing a Manchester encoded protocol. In a Manchester encoded protocol two pairs of wires are provided, one pair for transmission of data and the other for receipt.

Figure 7:
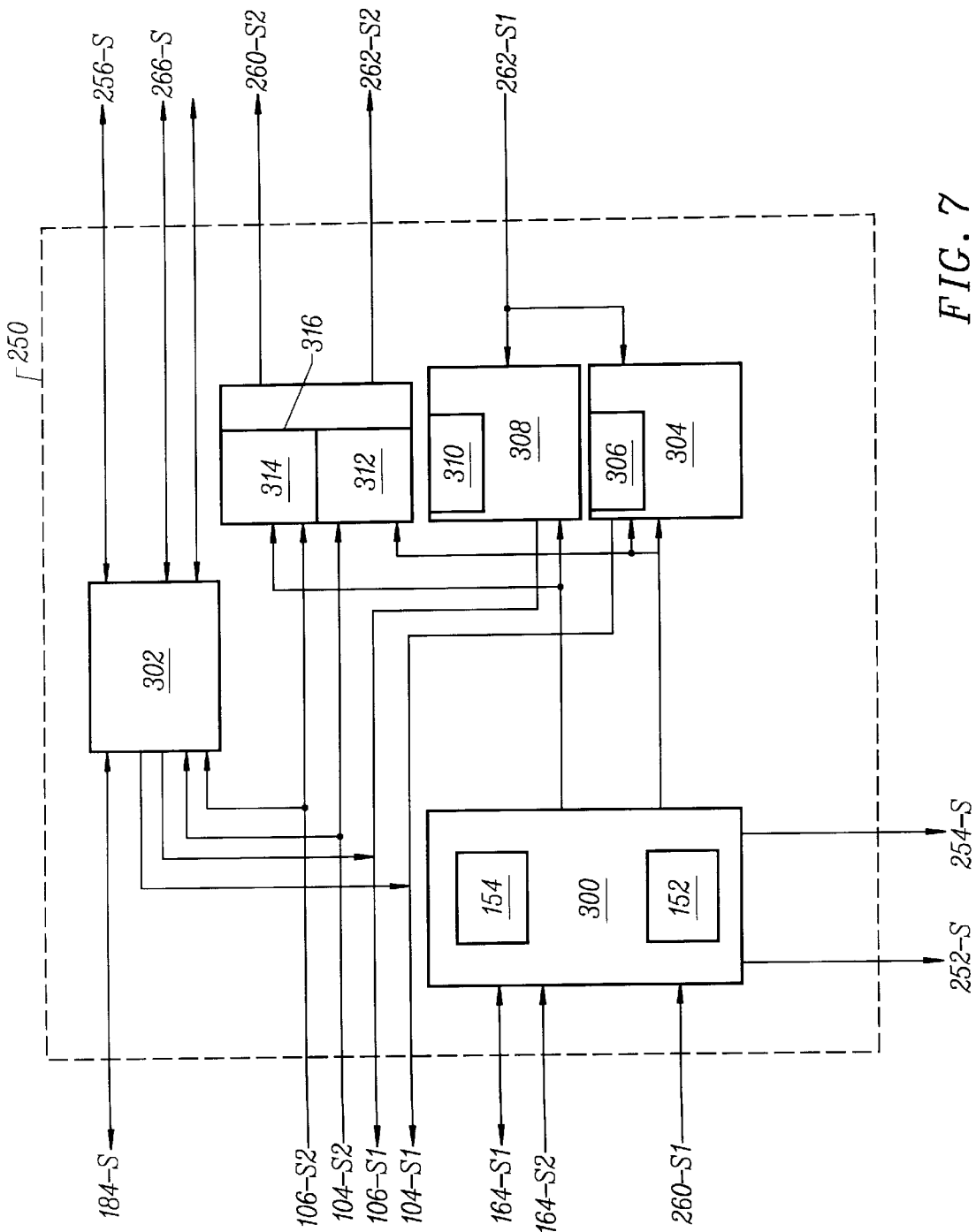
FIG. 7 is a detailed hardware block diagram of the configurable switch and conversion portions of the LAN/WAN bridge FIGS. 5–6.

FIG. 7 provides a detailed functional block diagram of FPGA 250 as well as showing some of the significant signal interfaces to that switch. Functionally switch 250 includes controller interface 300, conversion unit 302, mux 316 and first and second configurable receive units 304 and 308. Controller interface 300 includes registers 152–154. Mux 316 includes first and second configurable transmit portions 312–314 respectively. First configurable receive unit 304 includes phase synchronization buffer 306. Second configurable receive unit 308 includes phase synchronization buffer 310. Operationally, conversion unit 302 handles the conversion of an MII protocol signal from any of the three MACs 104, 106 and 184 to a signal protocol appropriate for either the MLAN portion of management bus 118 or for any of the three channels associated with the slow Ethernet bus 100. Mux 316 handles the selection of the specific backplane channel(s) on the fast Ethernet bus 72 to which data from a MAC will be transmitted. Transmission portions 312 and 314 of mux 316 handle the conversion of packets received from either of MACs 104–106 in an MII protocol to a fast Ethernet physical protocol. First configurable receive unit 304 handles both the selection of a specific channel on the fast Ethernet bus 72 as well as the conversion of traffic originating on that channel to an MII protocol for receipt by MAC 106.

FIG. 7 also shows various signals by which the FPGA 250 communicates with the components shown in FIGS. 5–6. Signal line 164-S2 corresponds to the bidirectional data communicated between CPU block 300 and control microprocessor 174 via switch control line 164. Signal line 164-S2 corresponds to the signals lines over which microprocessor 174 sends address and control signals to the controller interface. Signal line 260-S1 corresponds to the signal line by which collision detection and carrier sense information are received by the controller interface from collision detector 260 associated with the fast Ethernet bus 72. Signal lines 252-S and 254-S correspond to the control lines connecting the controller interface to the first and second front port interface units 252 and 254 shown in FIG. 6. Signal line 262-S1 corresponds to the inputs to the FPGA from BTL driver 262, which is connected to a selected channel(s) of the fast Ethernet backplane bus 72. Signal line 104-S1 and signal line 106-S1 correspond respectively to the lines over which data received and converted by first and second receive units 304 and 308 is passed to MACs 104 and 106, respectively, in an MII physical protocol. Signal lines 260-S2 and 262-S2 are the signal lines which connect Mux 316 to, respectively, collision detector 260 and BTL driver 262. These units 260 and 262 are connected to the fast Ethernet bus 72. These signals allow data to be transferred from the Mux to either of two selected channels of the fast Ethernet backplane bus 72. Signal lines 104-S2 and 106-S2 allow data to be transmitted in an MII protocol from MACs 104 and 106 to, respectively, first and second configurable transmission paths 312 and 314. As discussed above, these packets are converted from an MII to a physical protocol consistent with the fast Ethernet backplane bus by transmission path units 312 and 314. These packets are then placed on specific selected backplane channel(s) of fast Ethernet bus 72 by Mux 316.

Bi-directional communication between management MAC 184 and conversion unit 302 is conducted over signal line 184-S according to an MII protocol. Communications between conversion unit 302 and the control bus interface 256, shown in FIG. 6, are passed bi-directionally over signal line 256-S. Finally, communications between conversion unit 302 and the BTL driver 266 for the slow Ethernet backplane bus 100 are handled directionally by signal lines 266-S.

FIGS. 8A–D show the different physical protocols handled by the configurable bridge and processor unit 78 and 80. FIG. 8A shows a proprietary physical protocol implementation of IEEE 802.3u fast Ethernet standard practiced on each of the four channels of the fast Ethernet backplane bus 72. FIG. 8A includes a four-bit data line 350, an enable line 352, and a clock 354. Clock 354 is a 25 megahertz clock. Valid data on a channel is indicated when enable is in a logic one condition as shown on enable line 352. Data line 350 includes four bit lines, each of which transfers data at 25 Mbps. Thus, an IEEE 802.3u specification is complied with by splitting a packet amongst four bit lines and transmitting data in parallel.

FIG. 8B shows a proprietary physical protocol implementation of IEEE 802.3 slow Ethernet standard practiced on each of the three channels of the fast Ethernet backplane bus 72. FIG. 8B includes data line 356, enable line 358 and clock 360. The clock 360 is a 10 megahertz clock. Data is valid when enable is in a logic 1 condition. Data is transferred over a single bit line operating on the 10 megahertz clock on each of the three channels of the slow ethernet bus backplane bus 100.

FIG. 8C shows the physical protocol for implementing the MII physical protocol within bridge 78. This signal is transmitted over a four bit data line 362. Data is valid when an enable 364 is in a logic 1 condition. Data may be transferred at either a 100/10 megabit per second (Mbps) rate. In either case data is transferred over 4 bit lines operating in parellel. Therefore the clock implemented on these lines is wither a 25 megahertz clock signal 368 or a 2.5 megahertz clock 366. On the basis, solely, of FIGS. 8A and 8C it would appear that in the 100 megahertz MII physical protocol and the fast Ethernet protocol are identical. This is not, however, the case. These physical protocols differ in phase, carrier sense, and voltage level.

The front port physical protocol is shown in FIG. 8D. The RJ45 connectors allow LAN connections to the card. A Manchester encoded physical protocal can be implemented at these ports. That protocol calls for two pairs 370 of transmission lines, one pair for transmission and one for receipt of data. There is no clock or enable line. Rather a Manchester endoded data signal is passed on either the transmit or receive signal lines and the hosts on the network recreate the clock and decode the data signal.

Bridge and conversion unit 150 handles the conversion between the MII physical protocol shown in FIG. 8C and the physical protocols shown in either FIGS. 8A, 8B or 8D. Each of these conversion capabilities is necessary if MACs 104 and 106 shown in FIG. 5 are to be connected to the fast ethernet bus 72, the slow ethernet bus 100, or the front ports.

Figure 9A:
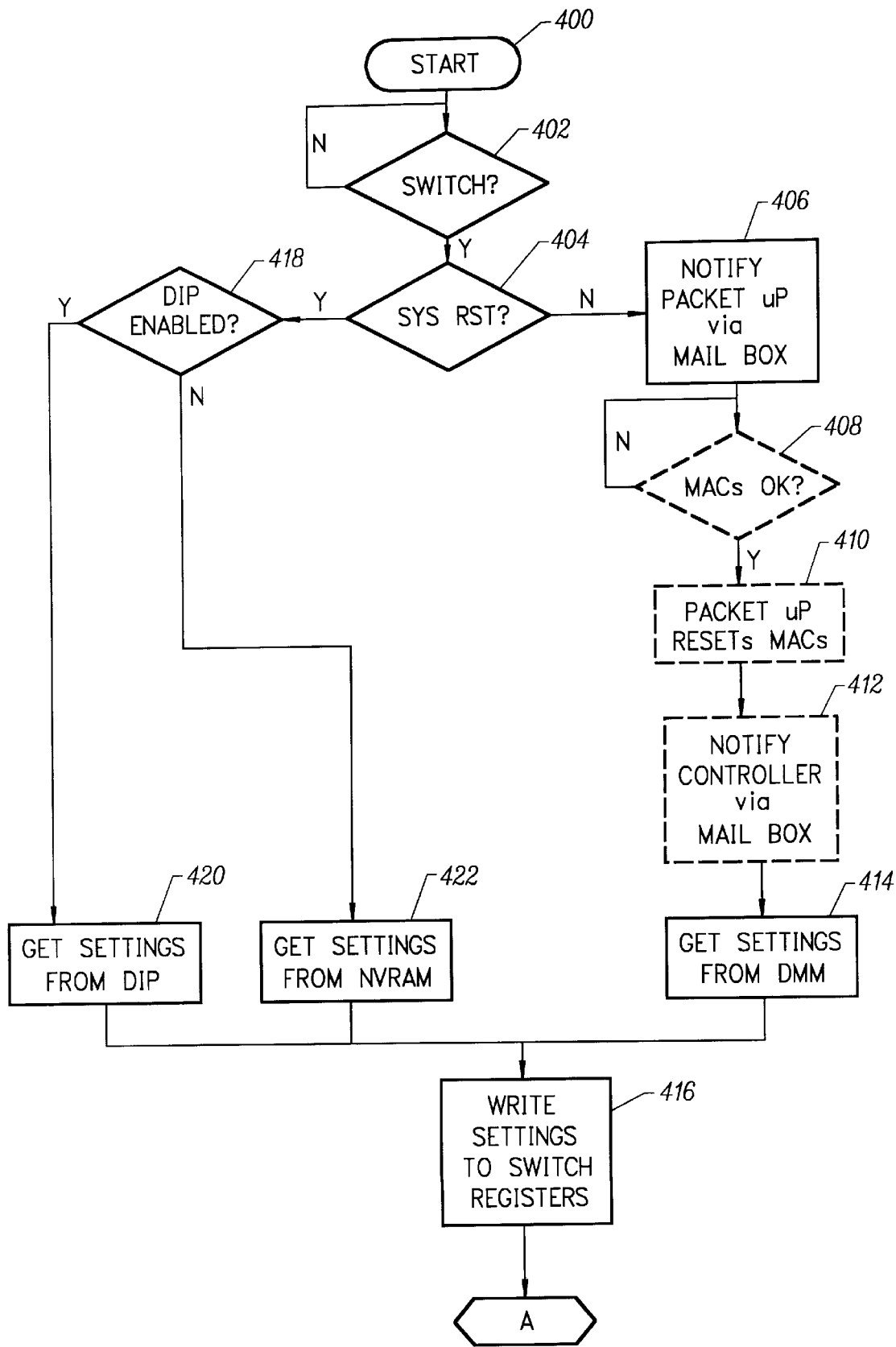
FIGS. 9A–C are process flow diagrams showing the interrelationships of the conversion, buffering, and switching functions performed by the configurable LAN/WAN bridge cards shown in FIG. 4.
Figure 9B:
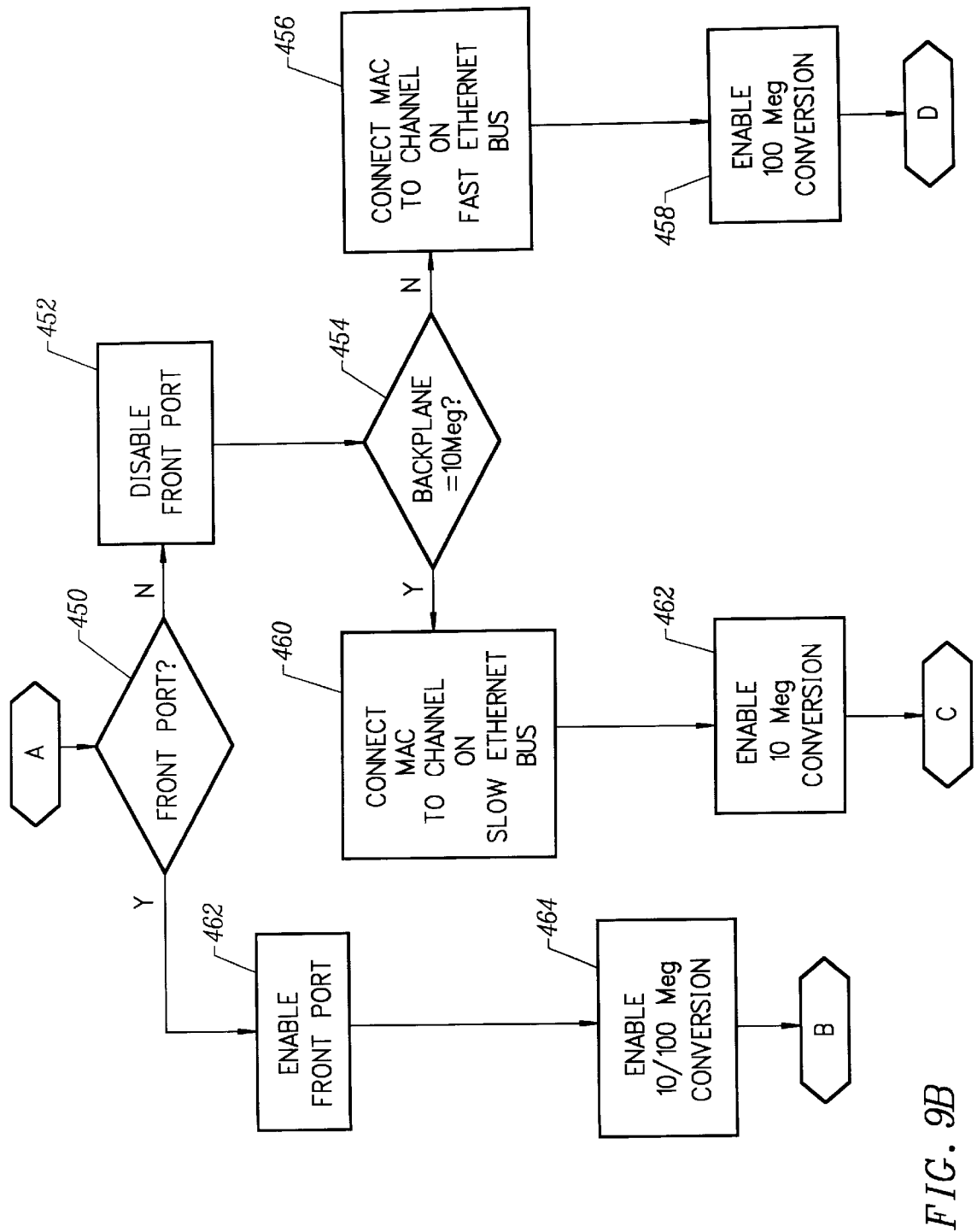

FIGS. 9A–B are process flow diagram showing the processing conducted in the configurable WAN/LAN bridge. From start block 400, control is passed to decision process 402. In decision process 402, a determination is made as to whether a switching request has been received by the control processor. If that determination is in the negative then control returns to decision 402. Alternately if the determination is in the affirmative, i.e., that a switching request has been received, then control is passed to decision 404.

In decision process 404 a determination is made as to whether the switching request is a result of a system reset. If that determination is in the affirmative then control is passed to decision process 418. In decision process 418, a determination is made as to whether the DIP switch connected to the control processor has been enabled. The DIP switch 168 is shown in FIG. 5. If the DIP switch is enabled then control is passed to process 420 in which the control processor 174, also shown in FIG. 5, reads the settings on the DIP switch. Control is then passed to process 416. Alternately if in decision 418 a determination is reached in the negative, i.e., that the DIP switch is not enabled then control is passed to process 422. In process 422 the control processor reads the configuration settings from non-volatile configuration PROM 166. Non-volatile PROM 166 is also shown in FIG. 5.

Alternately, if a determination is reached in decision process 404 that a system reset has not taken place then control is passed to process 406. In process 406 control processor is 174 has received a command over either the serial or MLAN bus. This process is discussed in great detail in connection with FIG. 5 above. When the processor 302 has received such a command the control processor notifies the packet processor via mailbox 176 that a switch is requested. Control is then passed to decision process 408.

Decision processes 408 and the following processes 410 and 412 are represented with a dotted border. This, indicates that these three processes are performed by the packet processor 196. In decision process 408 the packet processor either directs MACs 104 and 106 to abort transmission or checks the status registers of those MACs to determine when a quiescent state in which no packets are currently being processed is taking place. If a quiescent state switchover protocol is being followed then only when a determination is reached in the affirmative, i.e., that the status registers in both MACs 104 and 106 indicate a quiescent state will control passed to process 410. In process 410 the packet processor 196 will reset both MACs 104 and 106. Control is then passed to process 412 in which packet processor 196 notifies control processor 412 via mailbox 176 that a switch over can be initiated. Control is then passed to process 414 in which control processor 174 proceeds to process the command request. Control is then passed to process 416. In process 416 control processor 174 writes the new settings for the switch configuration to the register 152 and 154 of the MAC/PHY switch 150. Control is then passed via splice block A to decision process 450 shown in FIG. 9B.

Figure 9C:
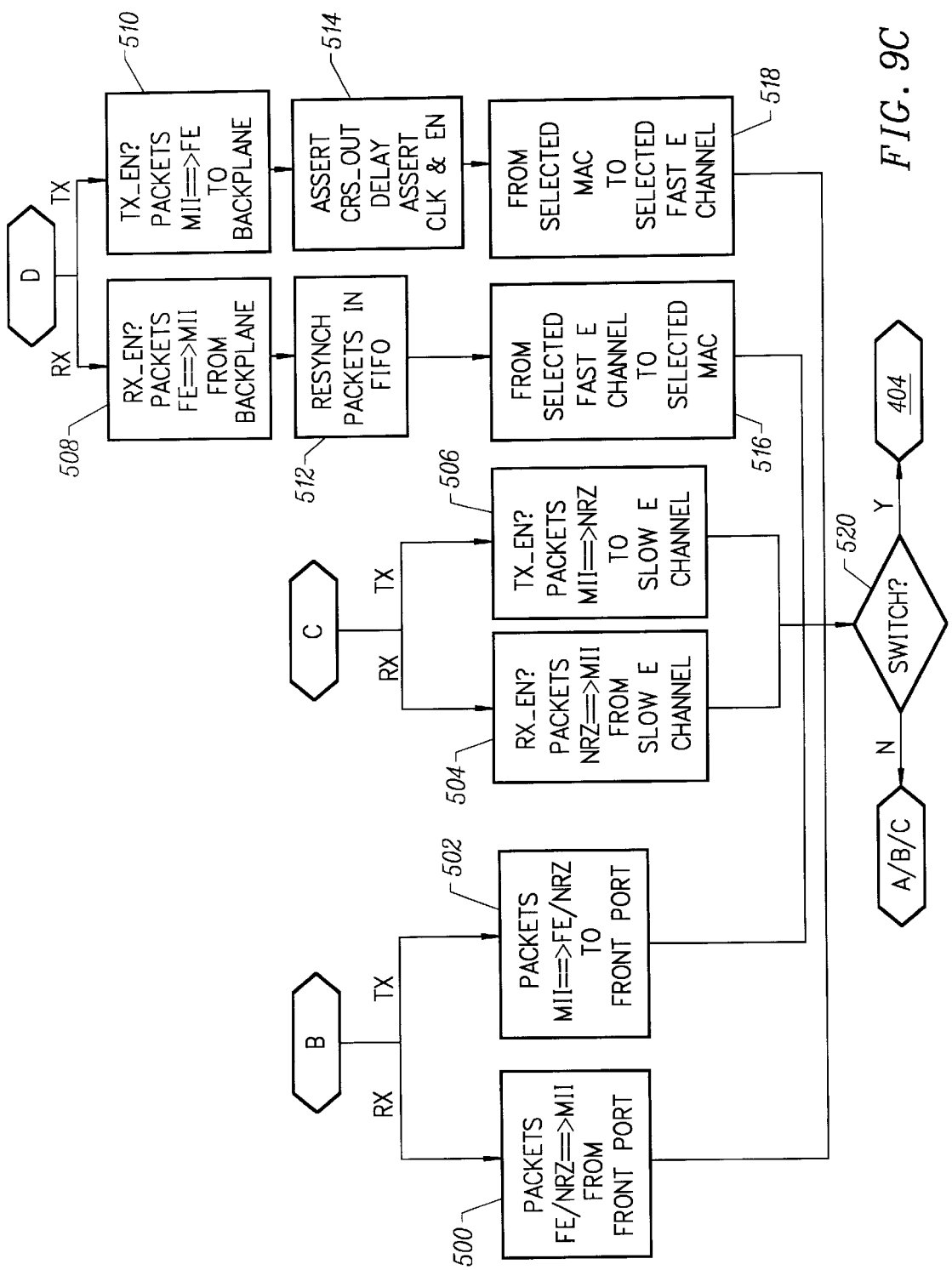

The processes shown in FIGS. 9B–C corresponds to those performed in MAC/PHY switch 150. These processes are implemented in parallel branches for configuration register 152 and its associated MAC 104 and for configuration register 154 and its associated MAC 106. These registers and the associated MACs and front ports are shown in FIG. 6.

In decision process 450, a determination is made by switch 150 as to how a MAC is to be connected, and initially that decision involves determining if the MAC is to be connected to a front port. Switch 150 makes this determination on the basis of the specific one among the eight bits in the configuration register which is associated with front port enablement. If the front port bit is enabled, then the MAC to front port connection is enabled. The enabling process 462 involves a signal being sent from FPGA 250, shown in FIG. 6, to whichever of interfaces 252 or 254 is associated with the MAC-front port connection which is being enabled. Control is then passed to process 464. In process 464 the FPGA enables the conversion feature of the enabled interface 252 or 254. Control is then passed to splice block B.

Alternately, if in the outcome of decision process 450 is in the negative, i.e., that the configuration register bit associated with the front port is not enabled, then control is passed to process 452. In process 452, the front port associated with the register is disabled. Control is then passed to decision process 454. In decision process 454 a determination is made as to whether a slow ethernet backplane bus channel connection is to be made. If that determination is in the affirmative then control is passed to process 460. In process 460 a connection is made between the MAC associated with the register being analyzed and the specific channel on the slow ethernet bus indicated by whichever of the bits in the register being analyzed is enabled. Control is then passed to process 462 in which the conversion of the physical protocols associated with slow ethernet and MII packets is enabled. Control is then passed to splice block C.

Alternately, if in decision process 454 a determination is reached in the negative, i.e., that a fast ethernet is to be enabled then control is passed to process 456. In process 456 a connection is made between the MAC associated with the register being analyzed and a one among the four fast ethernet channels on backplane bus 72. Control is then passed to process 458. In process 458 the conversion hardware for converting between MII and fast Ethernet physical protocols is enabled. Control is then passed to splice block D.

FIG. 9C indicates the remaining processes connected with the transmission and receipt of information between a MAC and the physical channel to which it is connected. This involves physical protocol conversions and additional considerations which will now be described. Splice block B corresponds to the transmission and receipt process connected with interfacing a MAC to a front port. In process 500 a packet received from a front port undergoes a conversion between a Manchester encoded physical protocol and an MII protocol. In process 502 packets transmitted from a MAC to a front port are converted from an MII physical protocol to a Manchester encoded physical protocol. Control is then passed to decision process 520.

Splice block C corresponds to the receipt and transmission process between a MAC and a specific one of the three channel on the slow ethernet backplane bus 100. In process block 504 a determination is made as to whether the signal line receipt enable is in a logic 1 condition. When that determination is in the affirmative data packets are retrieved from the slow ethernet channel and converted from a slow ethernet to an MII physical protocol. Control is then passed to decision process 520. In process 506 packets transmitted from a MAC to a specific slow ethernet backplane channel are converted from an MII to a slow Ethernet physical protocol. Control is then also passed to decision process 520.

Splice block D commences the processes associated with the transmission and receipt of packets between a MAC and a specific channel of the fast Ethernet bus 72. In process 508 a packet is subject to conversion from a fast Ethernet to an MII physical protocol when an enabled signal condition is detected. Control is then passed to process 512. In process 512 the clocks of the fast ethernet channel and the receiving MAC are normally out of phase and a synchronization of the received packets is required. This synchronization is accomplished by buffering the received packet using whichever of phase synchronization buffers 306 or 310 is associated with the MAC being configured. These synchronization registers are shown and discussed above in connection with FIG. 7. These registers allow the packets being transferred to be delayed sufficiently to correct for any phase shift that may exist between the bus clock and the FPGA clock. Control is then passed to process 516 in which packets are passed from a selected one among the four fast ethernet channels to the selected MAC. Control is then passed to decision process 520. In process 510 packets being transmitted from a MAC to a specific selected fast ethernet back channel on bus 72 is commenced when a transmission signal is enabled. Control is then passed to process 514. In process 514 a carrier sense signal is asserted and after a appropriate delay, a clock and enable signal is asserted on the fast ethernet channel. Control is then passed to process 518. In process 518 packets are passed from a selected MAC to the specific fast ethernet channel. Control is then passed to process 520.

In process 520 a determination is made that a switch is called for then control returns to process 404. Alternately, if a determination is reached in decision 520 that there is no switch request then control returns to whichever of splice blocks B, C, or D corresponds to the path enabled for the transmission/receipt of the next packet.

In another preferred embodiment, a single processor is substituted for the packet processor 196 and control processor 174. That single processor will performs all the functions described and discussed in connection with the control and packet processor.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A remote access including:
    at least two communication channels, including a first communication channel coupled a first network and a second communication channel coupled to a second network, and each of said at least two communication channels configured to support a transfer of a plurality of data packets;
    a first port that couples the first communication channel to the first network using a first protocol;
    a second port that couples the second communication channel to the second network using a second protocol;
    a first medium access controller that is coupleable to the first port and the second port to transmit and receive at least a data packet in the plurality of data packets;
    a second medium access controller that is coupleable to the first port and the second port to transmit and receive at least a data packet in the plurality of data packets;
    a bus connecting said first and said second medium access controllers to pass at least some of the plurality of data packets received by one of said first and said second medium access controllers to an other of said first and said second medium access controllers;
    a switch and conversion unit to selectively connect said first medium access controller to one of the first or second communication channel, and said second medium access controller to an other of the first or second communication channel,
    wherein the switch and conversion unit is configurable to connect the first medium access controller to the first communication channel so that a data packet in the plurality of data packets with a destination identifier corresponding to said first medium access controller is received by said first medium access controller, and transmitted by said second medium access controller to the second communication channel, said switch and conversion unit being able to convert the data packet received by the first medium access controller from the first protocol of the first port to the second protocol of the second port by first converting the data packet to an intermediate protocol; and a packet processor connected to said bus, said packet processor adapted to be forwarded said data packet received by said first medium access controller, and to pass said data packet to said second medium access controller after attaching a header to the said data packet, the header corresponding to a destination on the second network.

2. The remote access server of claim 1, wherein the first and second communication channel are further configured to support the transfer of the plurality of data packets in accordance with a carrier sense multiple access with collision detection (CSMA/CD) network protocol.

3. The remote access server of claim 1, wherein:

said first medium access controller further comprises a first identifier, and said first medium access controller configured to receive the data packet in the plurality of data packets which contains the destination identifier corresponding to said first identifier and to transmit a data packet in the plurality of data packets by appending a source identifier corresponding to said first identifier; and said second medium access controller further comprises a second identifier, and said second medium access controller configured to receive a data packet in the plurality of data packets which contains a destination identifier corresponding to said second identifier and to transmit a data packet in the plurality of data packets by appending a source identifier corresponding to said second identifier.

4. The remote access server of claim 1, wherein said first physical protocol is a Manchester encoded protocol and said second physical protocol is a fast Ethernet protocol.

5. The remote access server of claim 1, wherein said first physical protocol is a slow Ethernet protocol and said second physical protocol is a slow Ethernet protocol.

6. The remote access server of claim 1, wherein said first physical protocol is a Manchester encoded protocol and said second physical protocol is a slow Ethernet protocol.

7. The remote access server of claim 1, wherein the packet processor extracts a destination header from said data packet, appends said destination header to said data packet, and passes said destination header and data packet to said second medium access controller.

8. The remote access server of claim 1, further comprising:

a third medium access controller to receive data packets containing switch configuration commands;

a controller coupled to said configurable switch and conversion unit and to said third medium access controller to pass said switch configuration commands to said configurable switch and conversion unit; and said configurable switch and conversion unit further comprising a logic unit to reconfigure said switch in response to said switch configuration commands from said controller.

9. A method for connecting a medium access controller to one of at least two communication channels, each communication channel operating under a different protocol, said medium access controller equipped to transmit outgoing data packets with a source identifier corresponding to said medium access controller, and to receive incoming data packets which include a destination identifier corresponding to said medium access controller, and said method comprising:

detecting a switch request to connect the medium access controller to a selected one of said at least two communication channels; then detecting that the medium access controller is available; and connecting said medium access controller to said selected one of said at least two communication channels to receive or transmit a data packet in either the first or second protocol from the selected communication channel.

10. The method of claim 9, further comprising the step of;

implementing on each of said two communication channels a network protocol for a transfer of the incoming or outgoing data packets in accordance with a carrier sense multiple access with collision detection (CSMA/CD) network protocol.

11. The method of claim 9, further comprising the steps of;

detecting a next switch request to connect the medium access controller to an other selected one of said at least two communication channels;

receiving the incoming data packets the medium access controller in the first protocol; and transmitting the outgoing data packets from the medium access controller in either the first or second protocol to said other selected one of said at least two communication channels.

12. The method of claim 11, wherein the detecting step further comprises the step of;

determining that the medium access controller is in a quiescent state by identifying a pause in data packet transfer.

13. The method of claim 11, wherein the detecting step further comprises the step of;

causing the medium access controller to abort the transfer of a data packet.

14. The method of claim 9, wherein receiving the switch request occurs upon receiving a run-time command with the incoming data packets to the medium access controller.

15. The method of claim 9, including a step of converting the incoming data packets from the first protocol to an intermediate protocol with the media access controller after receiving the incoming data packets, and from the intermediate protocol to the first or second protocol within the media access controller prior to transmitting the outgoing data packets.

* * * * *